United States Patent
Yi et al.

(10) Patent No.: US 10,540,424 B2
(45) Date of Patent: Jan. 21, 2020

(54) EVALUATING DOCUMENTS WITH EMBEDDED MATHEMATICAL EXPRESSIONS

(71) Applicant: Microsoft Technology Licensing, LLC, Redmond, WA (US)

(72) Inventors: Sheng Yi, Redmond, WA (US); Nikola Nikolic, Rača (RS); Xiao Tu, Medina, WA (US); Ivan Stojiljkovic, Belgrade (RS); Jelena Mojasevic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 52 days.

(21) Appl. No.: 15/621,009

(22) Filed: Jun. 13, 2017

(65) Prior Publication Data
US 2018/0357207 A1    Dec. 13, 2018

(51) Int. Cl.
G06F 17/21       (2006.01)
G06F 17/27       (2006.01)

(52) U.S. Cl.
CPC .......... *G06F 17/215* (2013.01); *G06F 17/277* (2013.01); *G06F 17/2705* (2013.01); *G06F 17/2775* (2013.01); *G06F 17/2785* (2013.01)

(58) Field of Classification Search
CPC .. G06F 17/215; G06F 3/04883; G06F 17/277; G06F 17/2705; G06F 17/2785; G06F 17/2775; G06K 2209/01
See application file for complete search history.

(56) References Cited

U.S. PATENT DOCUMENTS 6,772,149 B1 *  8/2004  Morelock ......... G06F 17/30675
7,373,291 B2 *  5/2008  Garst .................... G06K 9/72
                                                          704/10
(Continued)

FOREIGN PATENT DOCUMENTS

DE        202015006393 U1      3/2017

OTHER PUBLICATIONS

Baker, et al., "A Linear Grammar Approach to Mathematical Formula Recognition from PDF", In Proceedings of the International Conference on Intelligent Computer Mathematics, Jul. 6, 2009, 16 Pages.
(Continued)

*Primary Examiner* — Angela A Armstrong
(74) *Attorney, Agent, or Firm* — Alleman Hall Creasman & Tuttle LLP

(57) ABSTRACT

Symbol recognition techniques may be applied to documents comprising various forms of content. Documents including both text and mathematical expressions may be problematic, as applying a recognizer that does not match the content may produce anomalous results. Instead, a parser may evaluate the document to classify respective regions as one of a text region or a mathematics region, based on the characteristics of each type of content. The recognizer corresponding to the content of each region may be applied to produce a composite document comprising both recognized text expressions and recognized mathematical expressions. Additional functionality may be presented based on the recognized content; e.g., text-based tools such as spell-check and natural-language translation may be applied to the text regions that comprise text expressions, and mathematics-based tools such as mathematical equation editors, mathematical expression solvers, and automated assignment (Continued)

grading may be applied to the mathematics regions that comprise mathematical expressions.

19 Claims, 9 Drawing Sheets

(56) References Cited

U.S. PATENT DOCUMENTS

| | | | |
|---|---|---|---|
| 7,890,486 B2 * | 2/2011 | Claghorn | G06F 17/30011 707/705 |
| 8,589,869 B2 * | 11/2013 | Wolfram | G06F 8/30 717/109 |
| 8,751,550 B2 * | 6/2014 | Vukosavljevic | G06F 3/04883 708/141 |
| 8,943,113 B2 * | 1/2015 | Yi | G06F 17/215 708/136 |
| 2006/0062466 A1 | 3/2006 | Zou et al. | |
| 2008/0115056 A1 * | 5/2008 | Escapa | G06F 17/215 715/267 |
| 2009/0304283 A1 * | 12/2009 | Predovic | G06K 9/00436 382/189 |
| 2013/0174017 A1 * | 7/2013 | Richardson | G06F 17/21 715/234 |
| 2013/0205200 A1 * | 8/2013 | Lazarevic | G06K 9/00463 715/244 |

OTHER PUBLICATIONS

Dejean Herve, et al., "A System for Converting PDF Documents into Structured XML Format", In Proceedings of the International Workshop on Document Analysis Systems, Feb. 13, 2006, 12 Pages.

Lin, et al., "Mathmatical Formula Identification in PDF Documents", In Proceedings of the International Conference on Document Analysis and Recognition, 2011, 5 Pages.

"International Search Report and Written Opinion Issued in PCT Application No. PCT/US2018/033573", dated Aug. 30, 2018, 15 Pages.

* cited by examiner

EVALUATING DOCUMENTS WITH EMBEDDED MATHEMATICAL EXPRESSIONS

BACKGROUND

Within the field of computing, many scenarios involve documents comprising an aggregation of a variety of content, such as typed text, handwritten text and drawings, mathematical equations, embedded images, videos, and other forms of media and data. The text may comprise a variety of formatting, such as a paragraph structure; tabular data that is formatted as a set of rows and columns; and margins and indenting. Formatting may also be applied to position sets of content relative to one another; e.g., an inline layout may be applied that causes some content (such as text) to provide space that accommodates other content (such as an image).

Within such scenarios, recognition techniques may be applied to identify the contents of a portion of the document, and to translate particular forms of content into other content with a greater degree of structure. As a first such example, a handwriting recognition technique may accept an image of a handwritten text, and/or may monitor live input from a touch device such as a stylus, and may translate the strokes of the image and/or input into a recognized set of alphanumeric symbols, which may then be encoded in a standardized format such as ASCII or Unicode. As a second such example, alphanumeric characters in a document (including alphanumeric characters encoded in a standardized format) may be semantically evaluated to identify the semantic content of an expression, which may enable a translation of the expression into a different language. Many such techniques may be utilized to recognize the contents of the document and to take appropriate responsive actions.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Recognition techniques that are applicable to the contents of a document often utilize a set of characteristics that describe the types of expressions encoded therein. As a first such example, a natural-language recognition technique for English-language expressions may be developed based on various characteristics of such written expressions, such as symbols utilizing the Latin alphabet; a paragraph formatting style, with expressions comprising sequences of characters that comprise words separated by spaces and written in a left-to-right manner and ending with a punctuation mark; and a dictionary of well-known words. A recognizer may utilize such characteristics to guide the recognition of English-language expressions in a document; e.g., a smudge in the image that renders a particular character in a word ambiguous may be resolved by comparing the options with the dictionary of known words, and preferentially choosing a word that exists in the dictionary over one that does not. As a second such example, a mathematical expression recognition technique for mathematical expressions may be developed based on various characteristics of written mathematical expressions, such as sequences of digits, mathematical symbols, and function names (e.g., the sine function), with spatial clustering that groups symbols into mathematical structures such as equations, fractions, and exponents. A recognizer may utilize such characteristics to guide the recognition of mathematical expressions in a document; e.g., symbols in close proximity may be recognized as a product, while symbols that are spaced farther apart may be recognized as different expressions.

A document that is to be evaluated may utilize a recognizer that is suitable for the type of content contained in the document. However, in some cases, the type of content may not be known; e.g., a document may contain both natural-language text and mathematical expressions. In some cases, natural-language text and mathematical expressions may utilize similar symbols and formatting; e.g., the character sequence "$\sin^2$" may be recognized as either the English-language word "sin" with a superscripted "2" character (perhaps denoting a footnote or endnote), or as the mathematical expression for the Sine function with a square exponent. Applying a text recognizer to the entire document, including this sequence of characters, may result in a purely text-based recognition and output, and may fail to provide functionality related to mathematics-based expressions, such as the provision of a mathematical expression evaluator. Conversely, if a mathematical expression recognizer is applied to the document that recognizes this character sequence as a mathematical expression, the output may not properly interpret the expression if intended as text, such as linking the superscript with a footnote or an endnote providing a bibliographic entry.

Still further problems may arise in the incorrect recognition of sequences; e.g., if a mathematical expression including an integration symbol, $\int$, is inserted inline into a document, the application of a text-based recognizer that matches symbols with the Latin alphabet may recognize the symbol as its closest alphanumeric character, such as a capital S. As a result, a mathematical expression such as "$\int e^t$" may be recognized as the English-language word "Set," producing unintended and often nonsensical output in the recognized document. Additional problems may arise when applying a mathematical expression recognizer to document that also includes English-language expression, such as: "$\int e^t$ is an example of the property of idempotency." The mathematical expression recognizer may begin evaluating the mathematical expression, but may attempt to identify the following text as a continuation of the mathematical expression, producing a nonsensical recognition result.

Presented herein are techniques for evaluating text documents with embedded mathematical expressions. In accordance with such techniques, a document parser may apply at least one parser to the document to identify mathematical expressions in the document, and, based at least in part on the mathematical expressions, classify regions of the document as one of a mathematics region and a text region. A document recognizer may apply a text recognizer to the regions classified as text regions to generate at least one recognized text expression, and apply a mathematics recognizer to the regions classified as mathematics regions to generate at least one recognized mathematical expression. A document compiler may compile the at least one recognized text expression and the at least one recognized mathematical expression to generate a composite document including both recognized text regions and recognized mathematics regions.

The processing of the document in this manner may enable the document to be recognized as an aggregation of text regions and mathematics regions. A composite document may then be stored comprising recognized text expressions for the respective text regions, and recognized mathematical expressions for the respective mathematics regions. Additional functionality may result from the recognition of text expressions and mathematical expressions. For example, text-based tools may be provided for the respective text expressions, such as text-based spell-checking and grammar checking; text indexing techniques that enable text-based searching; text summary techniques that summarize the content of the text expressions; and translation techniques that translate the text expressions from an initial language to a different language. On the other hand, mathematics-based tools may be provided for the respective mathematics regions, such as mathematical expression editors that facilitate the user in formulating mathematical expressions; mathematical expression solvers that perform a mathematical evaluation of the mathematical expressions and calculate a result; mathematical expression checkers that verify the correctness of mathematical expressions, such as automated homework checking; and mathematics visualization techniques that visualize mathematical expressions, such as plots or three-dimensional renderings. Many types of functionality may result from the recognition of text expressions and mathematical expressions in a document in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
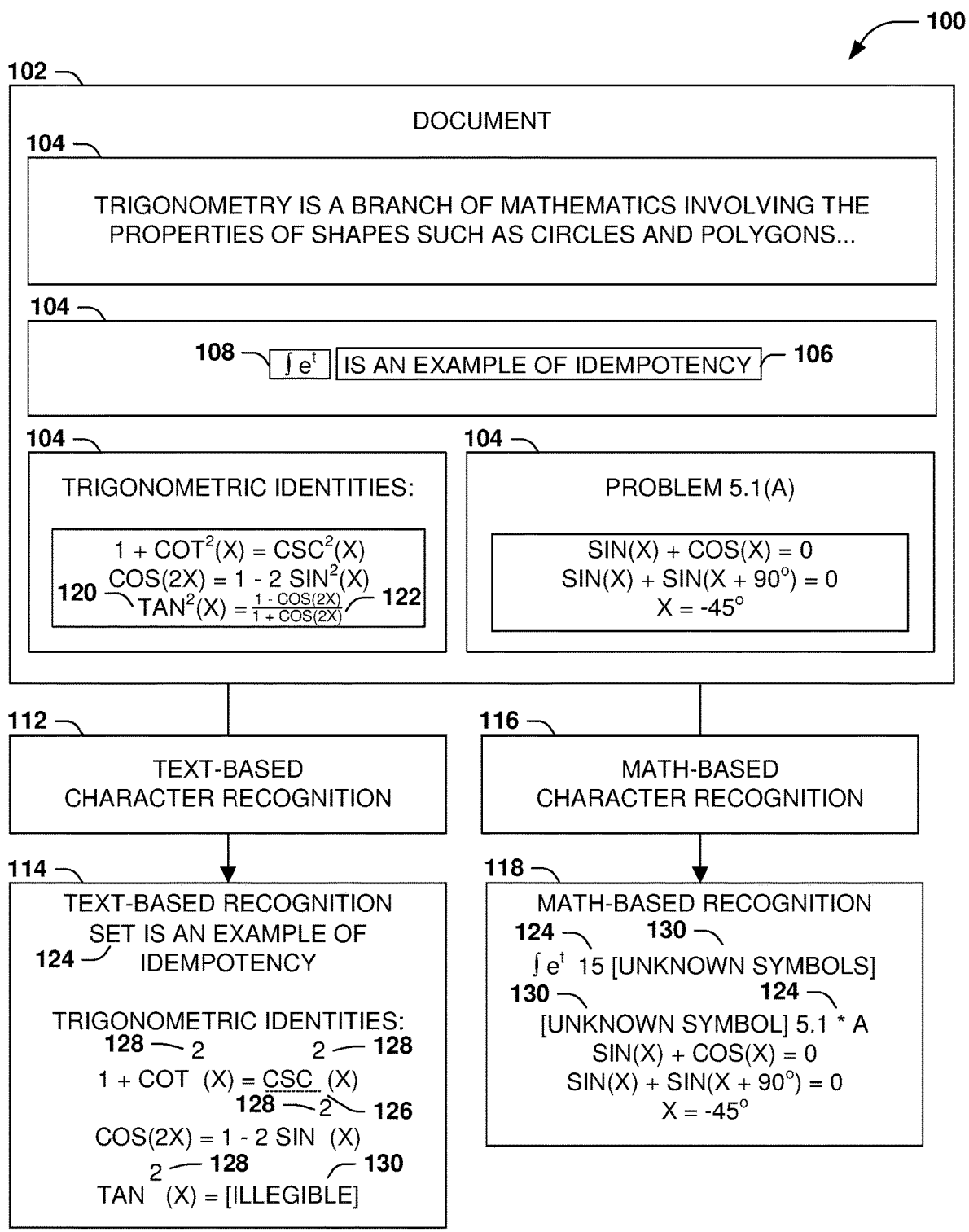
FIG. 1 is an illustration of an example scenario featuring various techniques for recognizing the content of a document.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring a presentation and evaluation of a document 102. In this example scenario 100, the document 102 comprises various sections of content 104 that present a set of expressions about mathematics, where some of the content 104 comprises text expressions 106 (e.g., an English-language natural-language description of a mathematics topic), and some of the content 104 comprises mathematical expressions 108 (e.g., formulae and equations). The content 104 may be provided as an image of handwritten text and/or typed text, such as a photo of a classroom whiteboard or a scanned page of a mathematics textbook. The content 104 may be arranged in various ways (e.g., as paragraphs, blocks, tables, or charts), and the document 102 may include other types of content, such as images, video, and embedded data files.

In this example scenario 100, it may be desirable to interpret the content 104 of the document 102 in order to provide some additional functionality. As a first example, images typically comprise a much larger volume of data than encoded symbols, such as ASCII or Unicode. If a large volume of documents 102 are provided (e.g., the contents of an academic library), the storage requirements may be considerably reduced by representing the content 104 of the documents 102 as encoded symbols rather than images. As a second example, it may be desirable to enable indexing and searching of the content 104, such as finding all instances of the term "idempotency" in the document, or all instances of the mathematical expression "$\sin^2(x)$". As a third example, it may be desirable to provide particular functionality for the respective types of content 104, such as a mathematical expression solver to apply to the mathematical expressions 108, and a spell-check and/or grammar-check tool for the text expressions 106.

Accordingly, a recognition technique may be utilized to interpret and extract the content 104 of the document 102. A variety of recognition techniques may be utilized to determine various properties of the document 102 and the content 104, such as the font style and size, and the format and layout. The application of recognition techniques may result in the extraction of a sequence of symbols that encodes the content 104 of the document 102. Such recognition techniques often utilize a set of characteristics about the content 104. For example, text expressions 106 in the English language are characteristically provided as a set of alphanumeric symbols in the Latin alphabet that comprise words in a left-to-right and top-to-bottom sequence. Formatting characteristics may also be utilized, such as the characteristic provision of sentences in a paragraph format, which may be initially indented, and which may conform to a justification style such as left justification, center justification, or full justification. Mathematical expressions 108 often exhibit a different set of characteristics; e.g., two symbols grouped together with a small amount of whitespace may represent a product, such as "$\sin(x) \cos(x)$" representing a product of two trigonometric functions, whereas a greater amount of whitespace, such as "sin(x) cos(x)" merely representing distinct and unrelated functions.

Recognition techniques often utilize a variety of such characteristics to guide the recognition of symbols that likely represent the content 104 with a high degree of classification confidence in the accuracy thereof. A significant challenge with such recognition is that the characteristics utilized by mathematical expressions 108 may not only be different than those utilized by text expressions 106, but may actually conflict. As a first such example, mathematical expressions 108 and text expressions 106 typically utilize a different set of symbols. For example, the Greek symbol μ is often utilized in mathematical expressions (e.g., as a standard symbol for electromagnetic permeability), but does not typically appear in English-language text expressions 106. If interpreted according to the symbol set of English-language text expressions 106, instances of this symbol may be inadvertently interpreted as a Latin alphabet lowercase U symbol. Conversely, English-language text expressions 106 sometimes include symbols such as the paragraph symbol (¶) and the copyright symbol (©), but these symbols do not often appear in mathematical expressions 108 and may be interpreted as different mathematical symbols. As a second such example, whereas English-language text expressions 106 are often grouped into a paragraph in which the end of a first sentence on a line may be immediately followed by the beginning of a second sentence, mathematical expressions 108 are rarely organized in such a manner. Conversely, mathematical expressions 108 utilize formatting structures such as fractions, comprising a numerator and denominator that are vertically aligned in the same line but separated by a fraction bar, while English-language text expressions 106 have no equivalent formatting structure. As a third such example, some characteristic may be utilized in both mathematical expressions 108 and text expressions 106, but may represent different semantics. For example, an expression such as "$\sin^2$" in a mathematical expression 108 may denote a trigonometric function with a square exponent, but the same expression in a text expression 106 may denote the English-language word "sin" and a reference numeral that associates the word with a footnote or endnote.

In view of these distinctions, it may be desirable to utilize a text-based character recognition technique 112 for the text expressions 106, and a mathematics-based recognition technique 114 for the mathematical expressions 108. However, in a document 102 such as presented in the example scenario 100 of FIG. 1 may complicate this task.

Applying the text-based character recognizer 112 to the document 102 may result in numerous anomalies in a resulting text-based recognition 114. As a first such example, a mathematical expression 108 such as "$\int e^x$" may be mapped to the closest matching English-language symbols to produce the English-language word "Set." The text-based character recognition technique 112 may identify this as a valid translation as it matches a known English-language word, and since the mathematical expression 108 is presented in sequence with a text expression 106. As a result, the text-based recognition 114 may include a mistranslation 124 that may be difficult for a reader to understand. As a second such example, the application of a dictionary of known terms may cause some correctly translated symbols to be flagged as typographical errors 126, such as the abbreviation "csc" that is commonly used to indicate the cosecant function in mathematical expressions 108, but that is not an accepted word in the English language 106. As a third such example, various instances of exponents 120 in mathematical expressions 108 may be translated as formatting, such as placing the exponents 120 on a separate line 128 in the text translation, or as a superscript that denotes a footnote rather than an exponent. As a fourth such example, some symbols may simply be identified as an error 130; e.g., a mathematical expression 108 may begin with full-height symbols but then includes a fraction 122 with half-height symbols separated by a fraction bar, but a text-based character recognition technique 112 may not be configured to anticipate or properly evaluate fractions, as such symbolic constructs do not exist in the English language. Instead, the text-based recognition technique 112 may endeavor to map the fraction 122 to English-language symbols, and failing to do so with any reasonable degree of classification confidence, may indicate an error at this point in the text-based recognition 114.

Similarly, applying the mathematics-based character recognizer 116 to the document 102 may result in numerous anomalies in a resulting mathematics-based recognition 118. As a first such example, the mathematical expression 108 "$\int e^x$" may be properly translated, but continued attempts to map the following symbols to mathematical symbols may result in a mistranslation 124 (e.g., mapping the word "is" to the number "15"), and may eventually result in an error 130 where such mapping is not achievable with an acceptable degree of classification confidence. As a second such example, the application of mathematical formatting semantics may result in a mistranslation 124 of some non-mathematical symbols. For example, the phrase "Problem 5.1 (A)" may simply provide an enumeration of a homework problem in the English language, but if interpreted according to the formatting characteristics of mathematical expressions 108, this phrase may indicate a multiplication of the value (A) by the numerical quantity 5.1. These and other forms of mistranslation 124 may arise from the naïve application of a text-based recognition technique 112 and a math-based recognition technique 116 to the document 102.

B. Presented Techniques

Figure 2:
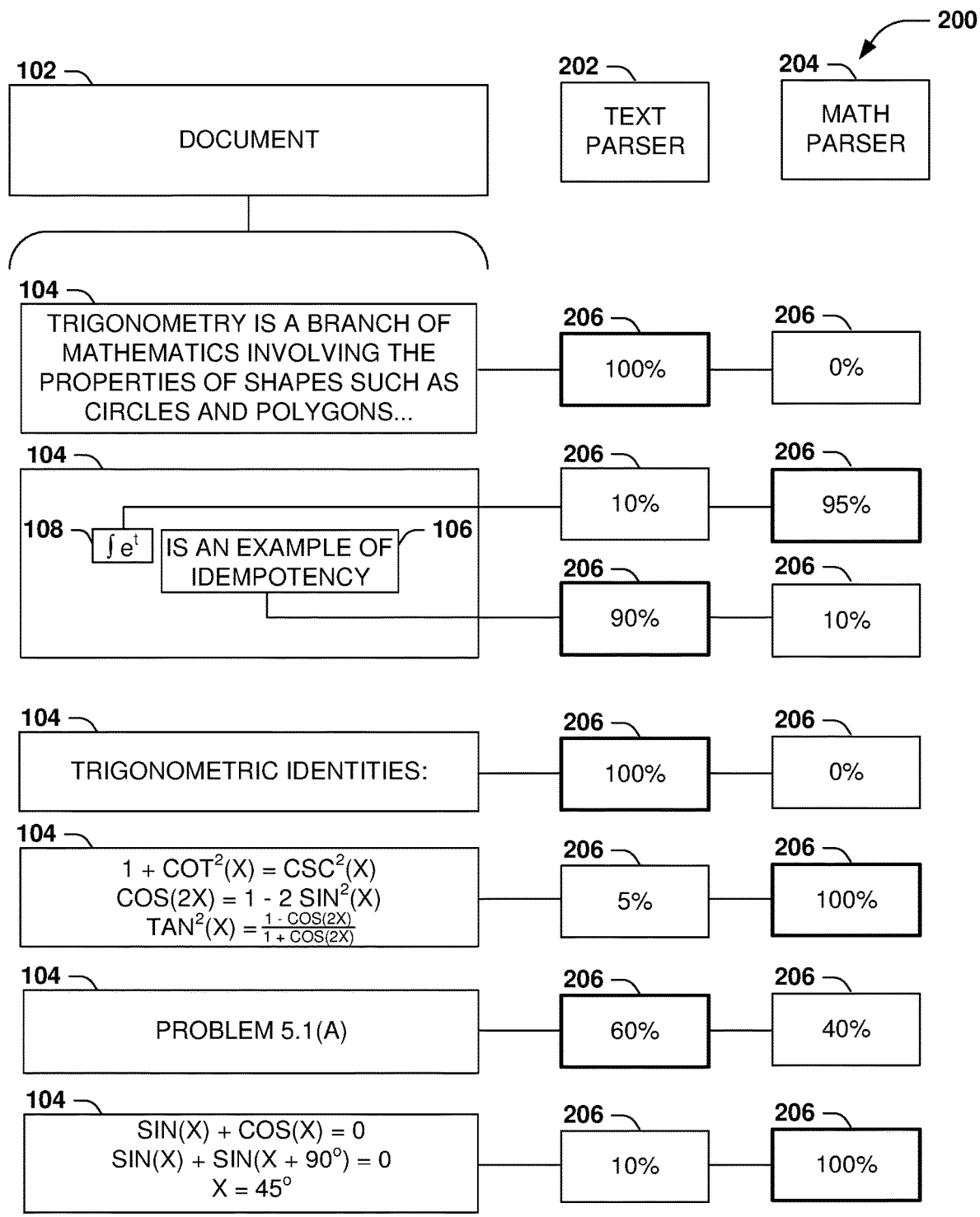
FIG. 2 is an illustration of an example scenario featuring various techniques for parsing the content of a document in accordance with the techniques presented herein.
Figure 3:
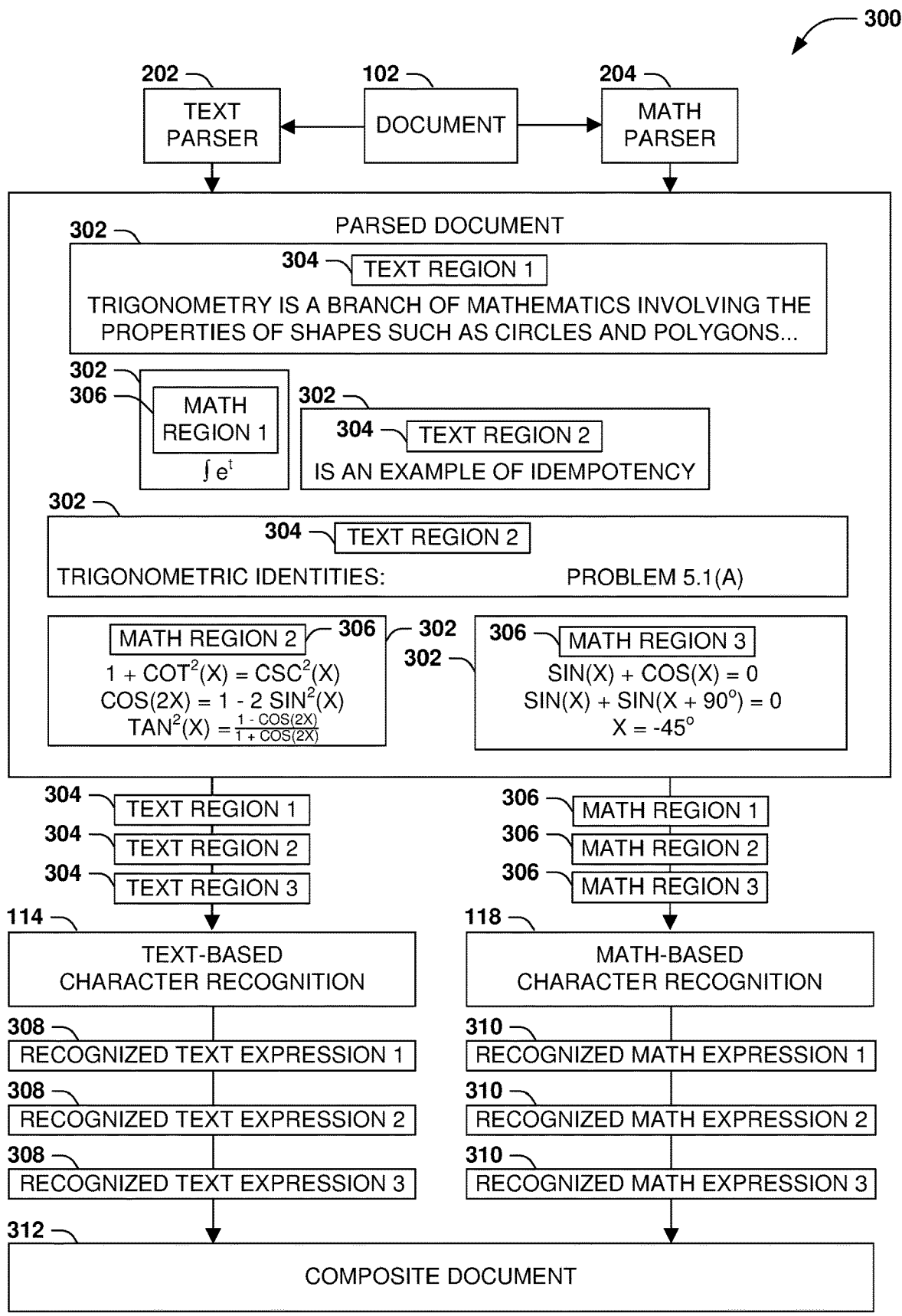
FIG. 3 is an illustration of an example various techniques for recognizing the content of a document in accordance with the techniques presented herein.

FIGS. 2-3, together, are an illustration of an example scenario 200 featuring an interpretation of the document 102 of FIG. 1 according to the techniques presented herein.

As illustrated in the example scenario 200 of FIG. 2, the document 102 is evaluated by a text parser 202 to identify text expressions 106 in the document 102, and a math parser 204 to identify mathematical expressions 108 in the document 102. For example, various sets of content 104 in the document 102 may be provided to the parsers, and each parser may indicate a classification confidence 206 that the content 104 is likely to comprise a type of expression that the parser recognizes. For example, a first set of content 104 comprising a narrative description of the topic of trigonometry may be evaluated by the parsers, and the text parser 202 may indicate a high text expression classification confidence 206 indicating that the content 104 is very likely a text expression 106, while the mathematics parser 204 may indicate a low mathematical expression classification confidence 206 indicating that the content 104 is very unlikely a mathematical expression 108. Such determinations may involve, e.g., a preliminary evaluation of whether the layout and/or formatting of the content 104 is characteristic of text expressions 106 and/or mathematical expressions 108; the identification and frequency of a few symbols that are highly characteristic of text expressions 106 and/or mathematical expressions 108 (e.g., looking for an instance of the word "the" as strongly characteristic of an English-language text expression 106, and looking for an instance of the symbol "=" as strongly characteristic of a mathematical expression 108); and/or the proximity and/or resemblance of the content 104 to other content 104 that has been previously identified as either a text expression 106 or a mathematical expression 108). Based on the classification confidence 206 reported by the text parser 202 and the mathematics parser 204, the content 104 may be identified as likely comprising a text expression 106. Other content 104 of the document 102 is processed in a similar manner. For example, sets of content 106 that are grouped together, such as sequences of equations, may be individually identified as mathematical expressions 108 (according to a high classification confidence 206 reported by the mathematics parser 204, and a low classification confidence 206 reported by the text parser 202).

As illustrated in the example scenario 200 of FIG. 2, the parsing of the document 102 in this manner may yield some instances of As a first such example, the parsers may identify some content 104 as comprising a first portion that is likely to be a mathematical expression 108 (e.g., "$\int e^x$"), for which the mathematics parser 204 reports a high classification confidence 206 and the text parser 202 reports a low classification confidence 206, and a second portion that is likely to be a text expression 106 (e.g., "is an example of idempotency"), for which the mathematics parser 204 reports a low classification confidence 206 and the text parser 202 reports a high classification confidence 206, despite the unusual term "idempotency." Accordingly, the content 104 may be identified as comprising distinct portions that are differently identified according to the parsers. Conversely, the parsing techniques illustrated in the example scenario 200 of FIG. 2 may promote accurate determinations for potentially ambiguous expressions. For example, the phrase "Problem 5.1(A)" may be identified by the text parser 202 as a text expression 106 with only a modest classification confidence 206 (since the symbols "5.1(A)" are not typical of English-language text expressions 106), but may be identified by the mathematics parser 204 as a mathematical expression 108 with an even lower classification confidence 206 (since word "Problem" is not among the set of identifiable mathematical symbols). Accordingly, this expression may correctly be identified as more likely to be a text expression 106 than a mathematical expression 108. Accordingly, the parsing of the content 104 of the document 102 in a comparative manner may enable an identification of the text expressions 106 and mathematical expressions 108 provided therein.

FIG. 3 presents an illustration of an example scenario 300 featuring the use of the comparative parsing example of FIG. 2 to complete the evaluation of a document 102. The application of the text parser 202 and the mathematics parser 204 to the content 104 of the document 102 enables an identification of text expressions 106 and mathematical expressions 108. Such identification may enable the classification of various regions 302 of the parsed document as either a text region 304, comprising text expressions 106, or a mathematics region 306, comprising mathematical expressions 108. For example, the respective regions 302 may be identified as a proximate collection of similarly identified expressions, such as a paragraph of English-language text expressions 106 or a block of mathematical expressions 108. In some instances, a particular area may be identified as comprising two differently classified regions 302, such as a mathematics region 306 followed by a text region 304 (e.g., "$\int e^x$" followed by "is an example of idempotency"), or a text region 304 that serves as a header for a mathematics region 306 (e.g., "Problem 5.1(A)"). In some instances, the classification may result in a mathematics region 306 being identified within an enclosing text region 304, or a text region 304 being identified within an enclosing mathematics region 306. In other instances, the proximity-based identification of regions 302 may also promote the disambiguation of regions 302 where the classification confidence 206 of the classification is not clear; e.g., within a set of high-classification confidence classifications of text expressions 206, a phrase that is ambiguously identifiable as either a text expression 206 or a mathematics expression 208 (such as the phrase "$\sin^2$") may be biased toward identification as a text expression 206 as part of a text region 304.

The regions 302 of the parsed document identified in this manner may be recognized using a corresponding recognizer. For example, the text regions 304 may be provided to a text-based recognition technique 114, and the mathematics regions 306 may be provided to a mathematics-based recognition technique 118, in order to produce recognized text expressions 308 and recognized mathematical expressions 310 that are respectively encoded in a symbolic format that is suitable for each type of content. The recognized text expressions 308 and recognized mathematical expressions 310 may then be compiled into a composite document 312 that includes both the text expressions 106 and the mathematical expressions 108 presented in the content 104 of the original document 102, in accordance with the techniques presented herein.

C. Technical Effects

The use of the techniques presented herein in the field of document evaluation may provide a variety of technical effects.

A first technical effect that may be achieved through the use the techniques presented herein involves a greater degree of accuracy in the recognition of the content 104 of documents 102 that comprise both text expressions 106 and mathematical expressions 108. As noted herein and particularly in the example scenario 100 of FIG. 1, a recognition of the document 102 simply by applying a text-based recognition technique 112 or a mathematics-based recognition technique 114 may result in a number of anomalies, particularly for expressions that may plausibly be recognized as one type of expression but that are more accurately recognized as the other type of expression (e.g., incorrectly recognizing the mathematical expression 108 "$\int e^x$" as the text expression 106 comprising the word "Set"). That is, applying a text-based recognition technique 112 may produce a lower-classification confidence but nevertheless plausible recognition of the expression as a text expression 106, whereas applying a mathematics parser 204 may correctly identify this set of symbols as a mathematical expression 108. The application of one or more parsers may also identify instances of mixed expressions, such as an inline combination of a mathematical expression 108 followed by a text expression 106, and the classification of such regions 302 as a mathematics region 306 and a text region 304, respectively, may enable the application of a recognizer that matches the content 104 of the respective regions 302. As generally illustrated in the comparative examples of FIGS. 1 and 2-3, the application of one or more parsers to the document 102 to identify text regions 304 and mathematics regions 306 may promote the accurate recognition of the content 104 of the document 102.

A second technical effect that may be achieved through the use the techniques presented herein involves an adaptation of the user interface of a document editing system presented to a user based on the results of the parsing. Some document editing environments may provide a first set of editing tools that assist users in entering text expressions 106 (e.g., spell-checking and grammar-checking tools) and a second set of editing tools that assist users in entering mathematical expressions 108 (e.g., expression editors that allow the user to define formatting structures such as parentheses, exponents, and fractions). However, many such document editing environments require the user to indicate, affirmatively, the type of content 104 that the user is currently entering, and/or to select the set of editing tools that the user wishes to use. Such requirements may become a nuisance if the user frequently switches between types of content, and therefore has to change the tool set provided by the document editing environment with each region transition. The parsing of the content 104 of the document 102 in accordance with the techniques presented herein may enable an automated selection of the set of tools presented to the user in an on-the-fly manner. When the user begins entering content 104 in a new region 302 or selects an existing region 302 to insert or edit content 104, the parsing may be applied to the content 104 determine to determine whether the region 302 comprises a text region 304 or a math region 306, and the document editing environment may automatically select and present the corresponding set of editing tools for the identified content 104. The parsing may also enable an automated identification when the content 104 in a region 302 of a first type is altered to content 104 of the other type (e.g., when a user is initially entering text expressions 106 in a text region 304, and then switches to entering a mathematical expression 108, prompting the identification of a new mathematics region 306). As another such example, the entry of content 104 may be facilitated by providing spelling-, syntax-, and grammar-checking services that distinguish recognized symbols and unrecognized symbols; e.g., a dictionary of English-language terms may be applied to utilized the spelling of words in the text regions 304, while a dictionary of mathematical terms may be utilized to verify the spelling of terms in the mathematics regions 306. In this manner, the parsing techniques presented herein may enable or facilitate the adaptation of the user interface that assist the user in the entry of content 104 into documents 102.

A third technical effect that may be achieved through the use the techniques presented herein involves the presentation of additional content-specific tools and functionality based on the automatic identification of content 104 provided in each region 302. For example, the recognized text expressions 308 may be further processed by a text-to-speech processor that reads text expressions, such as to promote accessibility; a translation service that translates the text expressions from a native language to a different language, such as automatically translating English-language text expressions 106 into Spanish-language text expressions 106; and a summarizing service that automatically evaluates the semantic content of the text expressions 106 and prepares a summary. Additionally, the recognized mathematical expressions 310 may be further processed by a mathematical equation solver that calculates and presents the solutions to mathematical expressions 108; a mathematical expression checker that verifies the accuracy of entered mathematical expressions 108, such as an automated mathematics homework grading service; and a mathematics visualizer that prepares and presents visualizations of mathematical expressions 108, such as plots of functions and two- and three-dimensional models of systems of equations. In this manner, in addition to assisting a user with entering and editing various types of expressions, the techniques presented herein may enable a variety of supplemental services to provide contextually relevant functionality to the content 104 of a document 102 in accordance with the techniques presented herein.

A fourth technical effect that may be achieved through the techniques presented herein involves the performance of the document evaluation process. Many aspects of the document editing scenario, notably including the other technical effects presented herein, may be facilitated by the organization of the recognition process as presented in the example embodiments of FIGS. 2-3, in which the parsing of the document 102 is distinguished from the recognition of the content 104 of the various regions 302 of the document 102. Whereas the recognition of the document 102 is performed to translate the entire content 104 of the respective regions 302 into a set of symbols encoded in a standardized format (e.g., translating the entire text expression 106 of a text region 304 into ASCII or Unicode), the parsing of the document 102 is provided only to identify the respective regions 302 as either a text region 304 or a mathematics region 306. In comparing these tasks, it may be appreciated that the parsing may comprise a relatively simpler task than the recognition of the content 104, and that a result of the parsing may be achievable in a shorter time frame, which may enable a lower latency between the entry of data by a user and functionality that is based at least in part upon this determination, such as the presentation of a user interface that matches the content 104 that the user is currently creating and/or editing. In this manner, the organization of the document evaluation process as distinct parsing and recognition tasks may enable the application of these tasks in a different manner based on the utility of the corresponding results. For example, the parsing process may be applied in a substantially continuous and realtime manner (e.g., frequently evaluating and/or reevaluating the content 104 created and/or edited by the user to classify the region 302 as one of a text region 304 and a mathematics region 306) to enable a highly responsive user interface, while the recognition of the content 104 may be provided on a deferred and/or offline basis to translate the document 102 into a standardized symbolic encoding. Many such technical effects may be devised that may arise from the organization of the document recognition process in accordance with the techniques presented herein.

D. Example Embodiments

Figure 4:
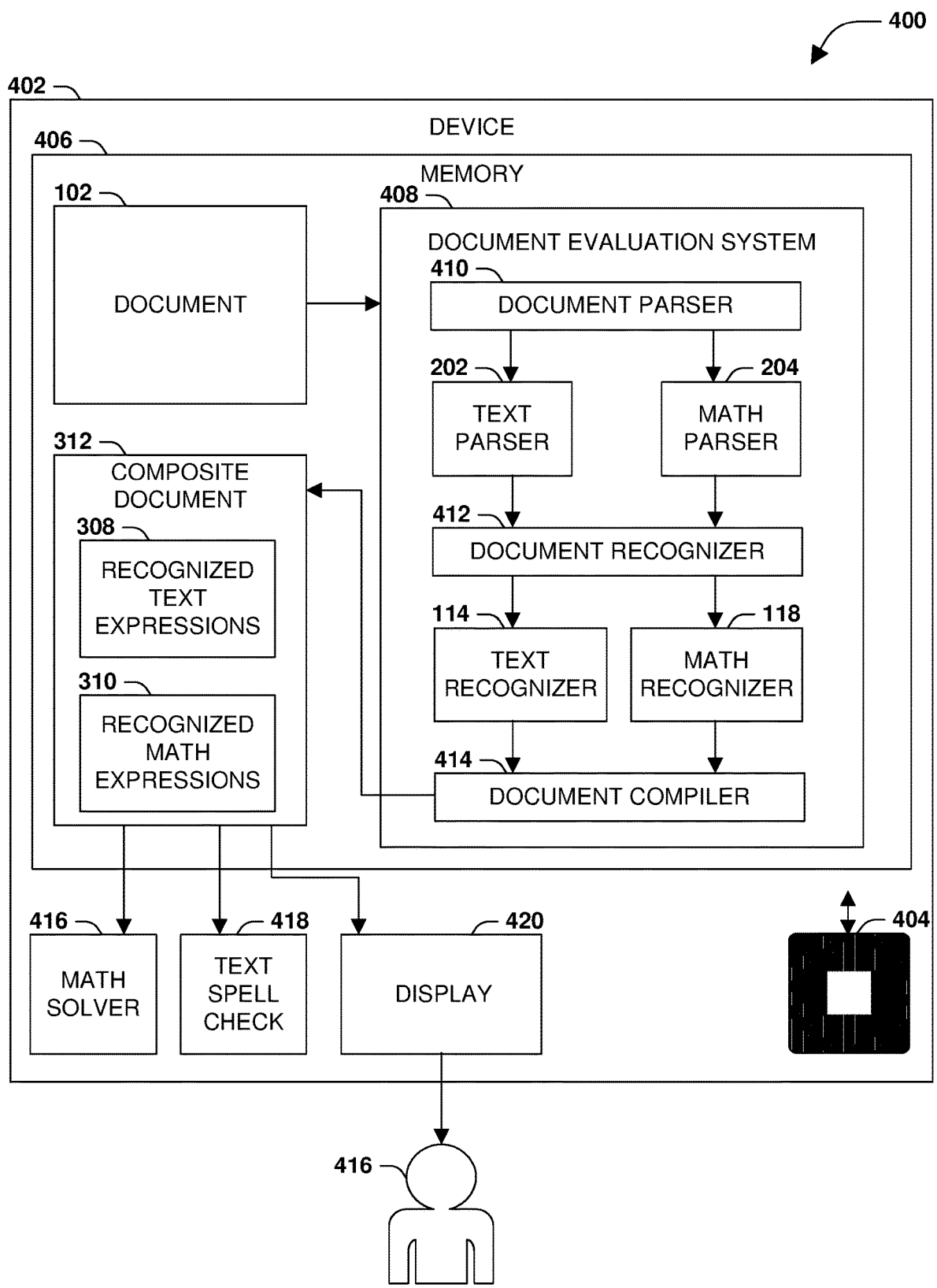
FIG. 4 is an illustration of an example device and system that evaluate the content of a document in accordance with the techniques presented herein.

FIG. 4 is an illustration of an example scenario 400 featuring a set of example embodiments that evaluate the content 104 of a document 102 in accordance with techniques presented herein.

In this example scenario 400, an example device 402 is provided that comprises a processor 404 and a memory 406 storing a document 102 and an example document evaluation system 408 that evaluates the content 104 of the document 102. The content 104 of the document 102 may be created by a user 416, e.g., using a keyboard, a handwriting instrument such as a stylus, or a speech processor that interprets verbal expressions of the user 416. Alternatively or additionally, the content 104 of the document 102 may be created by others and captured by the user 416, e.g., using a camera of the device 402 to capture the visual content 104 of a classroom whiteboard or a page of a textbook. The example document evaluation system 408 in the example scenario 400 of FIG. 4 comprises instructions stored in the memory 406 that, when executed by the processor 404, cause the example device 402 to apply the techniques presented herein to evaluate the content 104 of the document 102, and to generate a composite document 312 that is presented to the user 416 via a display 420 of the example device 402. Variations in such embodiments may also enable the use of the techniques presented herein, such as refactoring the functionality of the presented techniques into a different software architecture, and/or implementing one or more elements of the example document evaluation system 408 in a different manner, such as a discrete circuit or a field-programmable gate array (FPGA), where such alternative document evaluation systems also cause the document 102 to be evaluated in accordance with the techniques presented herein.

The example document evaluation system 408 comprises a document parser 401, which applies at least one parser to the document 102 to identify mathematical expressions 108 in the document 102. In this particular example scenario 400, the document parser 410 applies to the document 102 both a text parser 202 that identifies text expressions 106 in the content 104 of the document 102, and a math parser 204 that identifies mathematical expressions 108 in the content 104 of the document 102. Based at least in part on the identification of mathematical expressions 108 (and, optionally, the additional identification of text expressions 106), the document parser 410 classifies the regions 302 of the document 102 as one of a text region 304 and a mathematics region 306. The example document evaluation system 408 also comprises a document recognizer 412, which applies a text recognizer 114 to the regions 302 classified as text regions 304 to generate recognized text expressions 308, and applies a mathematics recognizer 118 to the regions 302 classified as mathematics regions 118 to generate recognized mathematical expressions 310. The example document evaluation system 408 also comprises a document compiler 414, which compiles a composite document 312 comprising the recognized text expressions 308 and the recognized mathematical expressions 310. In this manner, the example document evaluation system 408 enables the example device 402 to evaluate the document in accordance with the techniques presented herein.

Figure 5:
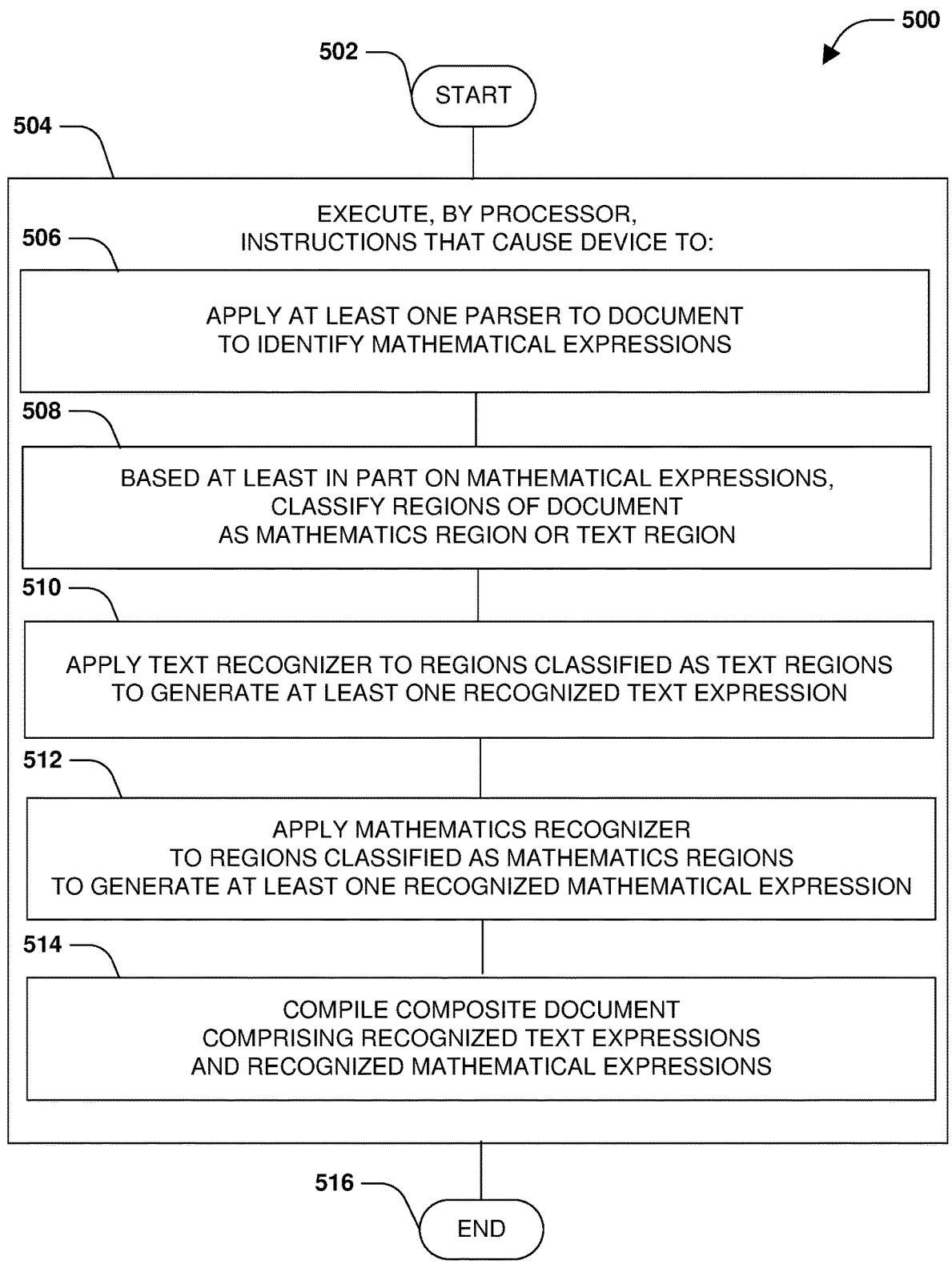
FIG. 5 is an illustration of an example method of evaluating the content of a document in accordance with the techniques presented herein.

FIG. 5 is an illustration of a third example embodiment of the techniques presented herein, illustrated as an example method 500 of evaluating the content 104 of a document 102. The example method 500 involves a device having a processor 404, and may be implemented, e.g., as a set of instructions stored in a memory 406, such as firmware, system memory, a hard disk drive, a solid-state storage component, or a magnetic or optical medium, wherein the execution of the instructions by the processor 404 causes the device to operate in accordance with the techniques presented herein.

The example method 500 begins at 502 and involves executing 504 the instructions on the processor 404. In particular, executing the instructions causes the device to apply 506 at least one parser to the document 102 to identify mathematical expressions 108 in the document 102. Executing the instructions further causes the device to, based at least in part on the mathematical expressions, classify 508 regions of the document 102 as one of a mathematics region 306 and a text region 304. Executing the instructions further causes the device to apply 510 a text recognizer 114 to the regions 302 classified as text regions 304 to generate at least one recognized text expression 308. Executing the instructions further causes the device to apply 512 a mathematics recognizer 118 to the regions 302 classified as mathematics regions 306 to generate at least one recognized mathematical expression 310. Executing the instructions further causes the device to compile 514 a composite document 312 comprising the at least one recognized text expression 308 and the at least one recognized mathematical expression 310. In this manner, the example method 500 enables the device to evaluate the content 104 of the document 102 in accordance with the techniques presented herein, and so ends at 516.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
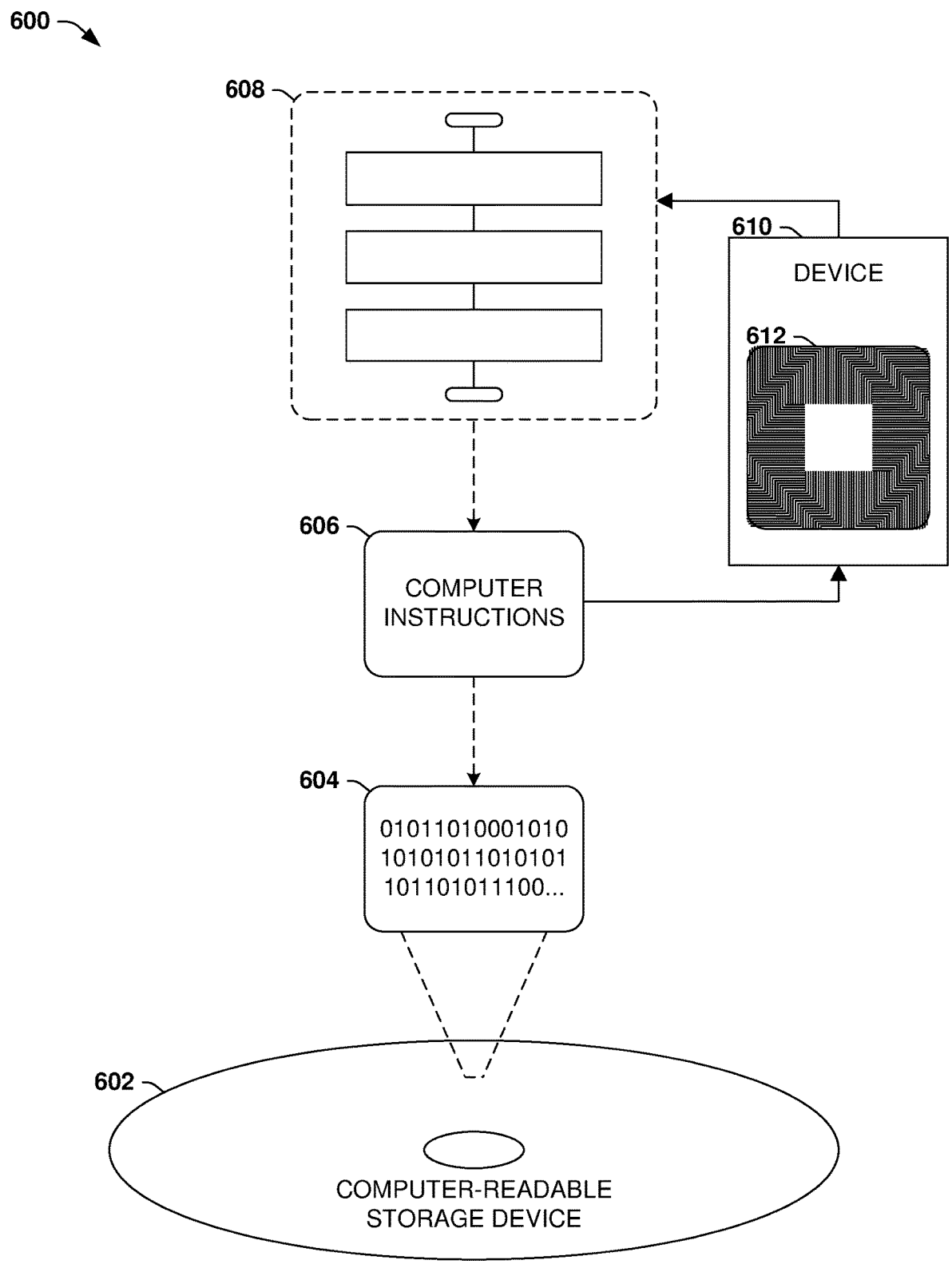
FIG. 6 is an illustration of an example computer-readable storage device that enables a device to present an application within a virtual environment in accordance with the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 404 of a device, cause the device to operate according to the principles set forth herein. As a first such example, the processor-executable instructions 606 may provide a system of evaluating the content 104 of a document 102, such as the example document evaluation system 408 in the example scenario 400 of FIG. 4. As a second such example, execution of the processor-executable instructions 606 may cause a device to perform a method of evaluating the content 104 of a document 102, such as the example method 500 FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example device 402 of FIG. 4; the example document evaluation system 408 of FIG. 4; the example method 500 of FIG. 5; and/or the example computer-readable memory device 600 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized on a variety of devices, such as servers, workstations, laptops, consoles, tablets, phones, portable media and/or game players, embedded systems, appliances, vehicles, and wearable devices. Such devices may also include collections of devices, such as a distributed server farm that provides a plurality of servers, possibly in geographically distributed regions, that interoperate to evaluate the content 104 of documents on behalf of a variety of users 102, such as administrators, guests, customers, clients, and other applications and/or devices. Additionally, devices implementing the techniques presented herein may also comprise a variety of input devices, such as a keyboard; a handwriting-style input device such as a stylus or touch-sensitive display; a microphone and a voice processor that receives verbal input; and a camera or scanner that receives images of the document 102, such as a photo of a classroom whiteboard or a page of a textbook.

As a second variation of this first aspect, the techniques presented herein may be utilized with a variety of documents 102, such as textbooks, treatises, whiteboard illustrations, written or typed notes, exams or homework assignments, and reference guides. The documents 102 may also comprise data retrieved from a network, such as the content 104 of one or more web pages of a website. The documents 102 may be limited to text expressions 106 and mathematical expressions 108, or may also include other forms of content 104, such as images or embedded data files. The documents 102 may be created by a user 416 of the device, and/or created by a third party and captured and/or received by the user 416. The documents 102 may be originally created on a device implementing the techniques presented herein, and/or may be created elsewhere and then received by the device, such as scans of a textbook. As one example, a document evaluation service may be provided over the internet, such as a cloud-based document analysis service, that evaluates the content 104 of documents 102 transmitted to the service over a network such as the Internet. As another example, a user may utilize a first device to create the document 102, and a second device to evaluate the document 102 according to the techniques presented herein.

As a third variation of this first aspect, the documents 102 processed by the techniques presented herein may provide a variety of content 104. As a first such example, the text expressions 106 may comprise, e.g., statements originally stated and/or written in a natural language, such as English or Spanish, and/or statements translated into a natural language from other sources, such as text expressions 106 originally provided in an initial language and then translated into a natural language. The text expressions 106 may also be an aggregation of text expressions 106 in different languages, such as a document 102 that includes text expressions 106 in both English and Spanish languages. Alternatively or additionally, the text expressions 106 may be presented in other types of languages, such as auxiliary or constructed languages (e.g., Esperanto or Klingon); nonverbal languages (e.g., sign language or Braille); and/or functional languages (e.g., a programming language). The text expressions 106 may be created by an individual, such as a user 416 of the device, and/or may be created by a device, such as a prose generation algorithm. As a second such example, the mathematical expressions 108 may also comprise a variety of expressions, such as verbal mathematical expressions 108 (e.g., spoken equations) and mathematical expressions 108 generated by a device (e.g., an algebraically related system of equations generated by a computer). As a third such example, the text expressions 106 may be originally integrated with the mathematical expressions 108, or may have been aggregated from one or more sources (e.g., an originally text document that is supplemented with mathematical expressions 108).

As a fourth variation of this first aspect, a variety of architectures may be utilized in devices embodying the techniques presented herein. Such devices may utilize a variety of technologies, such as a volatile or nonvolatile memory storing instructions that, when executed by a processor 404, cause a computing device to utilize the techniques presented herein; a set of discrete circuit components that implement one or more portions of the functionality of the techniques presented herein; and/or hybrid solutions, such as a field-programmable gate array (FPGA) that synthesizes a structural circuit based upon a functionally specified program. Additionally, devices, systems, and methods implementing the techniques presented herein may utilize a variety of organizations of elements; e.g., the number, order, and/or hierarchical relationships of the steps of such a method may vary, and the number, functionality, and/or hierarchical relationships of the elements of such a device or system may be varied. As a first such example, systems embodying the currently presented techniques may utilize distinct elements comprising a text parser 202, a mathematics parser 204, a text recognizer 114, and a mathematics recognizer 118; other systems may combine one or more elements, such as providing a combined mathematics parser 204/mathematics recognizer 118, or a combined text parser 202/mathematics parser 204. As a second such example, the components of such systems may operate in sequence (e.g., a text parser 202 may be first applied to the document 102, and upon the completion of its evaluation, a mathematics parser 204 may be applied) and/or concurrently (e.g., a text parser 202 and a mathematics parser 204 may be applied to the same document 102 at the same time). Other embodiments may entirely omit a text parser 202, and may presume that all regions 302 that are not claimed by the mathematics parser 204 are, by default, text expressions 106. Such architectural variations may nevertheless embody the elements of the presented claims. All such variations in scenarios and architectures are within the scope of the disclosed techniques presented herein.

E2. Parsing Techniques

A second aspect that may vary among embodiments of the techniques presented herein involves the manner of parsing the content 104 of the document 102 into regions 302, identifying expressions as one of a text expression 106 and a mathematical expression 108, and accordingly classifying the respective regions 302 into one of a text region 304 and a mathematics region 306. A variety of factors may be utilized to inform the determination of each such task.

As a first variation of this second aspect, the parsing may involve identifying expressions as one of a text expression 106 and a mathematical expression 108 by identifying one or more characteristic symbols in the expression. As a first such example, an expression may be identified as a text expression 106 if it includes symbols that are characteristic of text expressions 106 (and that are not characteristic of mathematical expressions 108), such as punctuation marks like quote marks. For example, an expression may be identified as a mathematical expression 108 if it includes symbols that are characteristic of mathematical expressions 108 (and that are not characteristic of text expressions 106), such as arithmetic operators (e.g., the symbols "+", "−", "*", and/or "/"), including an inline symbol sequence joined by an equality connector (e.g., "<", ">", or "="). Although this technique may resemble traditional symbol recognition, it may be appreciated that this identification process may be considerably simpler than a full recognition process; rather than attempting to map every symbol of the expression to a known symbol in an encoding such as ASCII or Unicode, this parsing technique only involves identifying the presence of instances of a smaller set of symbols that are diagnostic for the identification of the expression as either a text expression 106 or a mathematical expression 108. As a second such example, the parsing may involve identifying expressions as one of a text expression 106 and a mathematical expression 108 by generally considering the types of symbols used therein. For example, an expression that is primarily comprised of digits and arithmetic operators may be identified as a mathematical expression 108, while an expression that is primarily comprised of letters and punctuation marks grouped into words separated by spaces may be identified as a text expression 106. While this parsing technique may involve a greater degree of matching input with known symbols, this technique may nevertheless still be more streamlined than a complete recognition technique, which also seeks to map collections of symbols into entities such as known words in the English language. By looking only at the types of symbols used in the expression without regard to an entity (such as a word or a number) to which a collection of symbols is translated, this parsing task may be performed on a faster and more efficient basis.

As a second variation of this second aspect, the parsing of an expression may be achieved according to the format, spacing, and layout of the symbols. For example, mathematical expressions 108 are often arranged as an inline symbol sequence primarily comprising mathematical symbols, while text expressions 106 may comprise sequences of symbols arranged as words and separated by spaces. Alternatively or additionally, the parsing may be based upon a determination that the symbols are clustered in a manner that is characteristic of either a sequence of words provided in a paragraph-style layout, or as a sequence of symbols in an equation-style layout comprising one or more mathematical structures (e.g., exponents and fractions). Such parsing may be capable of distinguishing between text expressions 106 and mathematical expressions 108 without regard to the actual symbols so formatted.

As a third variation of this second aspect, the parsing and/or recognition may be based upon a static arrangement of symbols, such as an image. Alternatively, the parsing and/or recognition may be based upon a sequence of input characters or strokes by an individual creating the document 102. For example, the parsing may involve tracking a handwriting process of a user and identifying, as a text expression 106, a set of handwritten symbols in a substantially linear sequence (e.g., the sequence of English-language handwriting often follows the left-to-right and top-to-bottom layout of the language). Conversely, the parsing may, by tracking the handwriting process of the user, identify, as a mathematical expression 108, a set of handwritten symbols in a substantially non-linear sequence (e.g., when writing mathematical structures such as fractions, and performing mathematical processes such as addition, multiplication, and long division, the user's handwriting may exhibit substantially more vertical variance and leftward movement than when formulating text expressions 106).

As a fourth variation of this second aspect, the parsing may consider non-symbolic that is associated with an expression as relating to the determination of the content 104 as a text expression 106 or a mathematical expression 108. For example, a mathematical expression 108 may be associated with a mathematical drawing, such as a plot of a function. The parsing may be capable of evaluating non-symbolic content that is associated with an expression, and, by identifying the content as a mathematical drawing, may identify the expression as a mathematical expression by association. While such information may not be dispositive in isolation, the parsing may holistically consider this information alongside other factors to complete a determination of an expression as either a text expression 106 or a mathematical expression 108.

Figure 7:
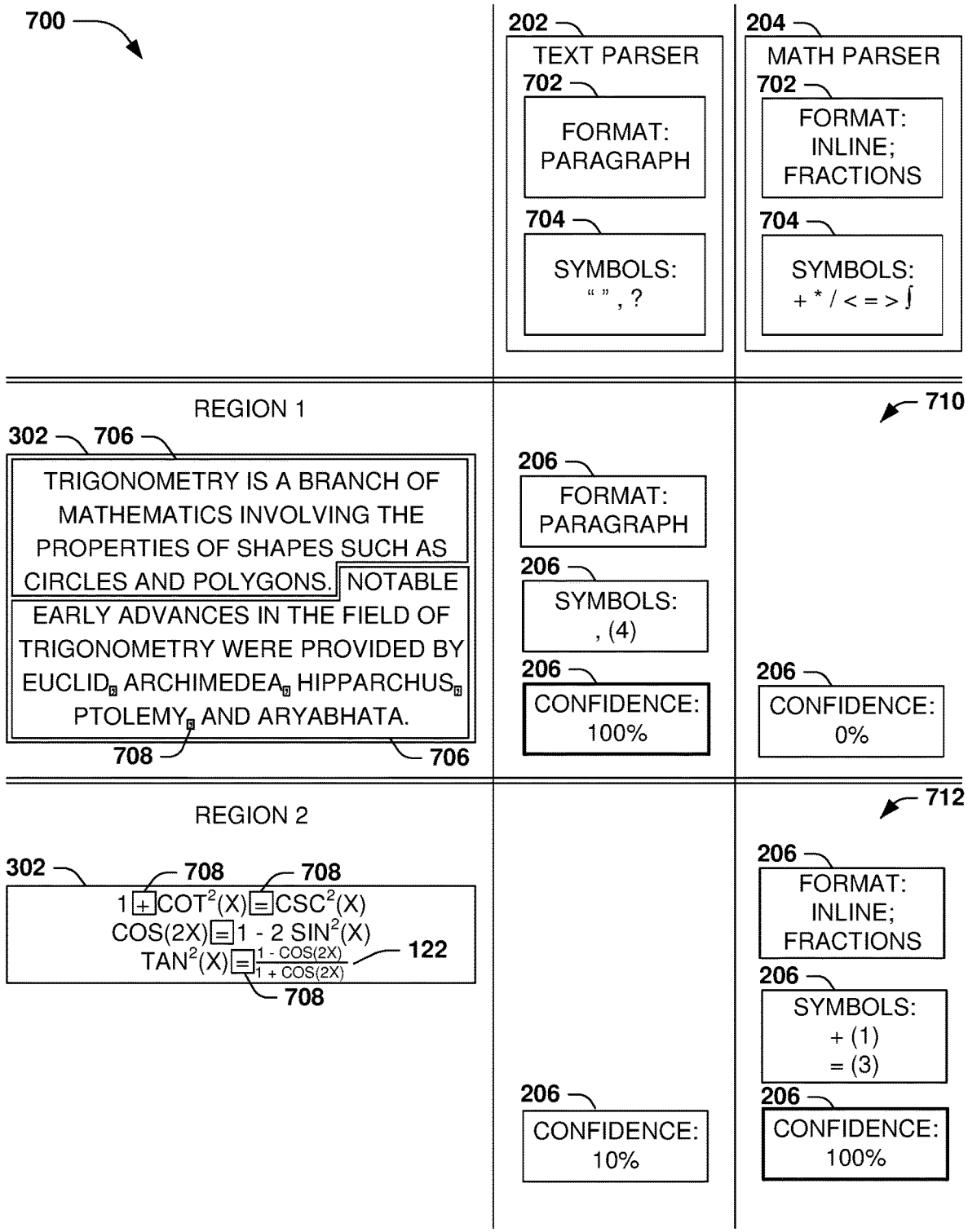
FIG. 7 is an illustration of an example scenario featuring examples of parsing the content of a document in accordance with the techniques presented herein.

FIG. 7 is an illustration of an example scenario 700 featuring examples of parsing the content 104 of various expressions of a document 102 in accordance with the techniques presented herein. In this example scenario 700, a text parser 202 is provided that evaluates expressions according to a set of characteristics, such as a distinctive format 702 in which text expressions 106 are often provided (e.g., paragraph style) and a set of symbols 704 that are more likely to appear in text expressions 106 than mathematical expressions 108 (e.g., quotation marks, commas, and question marks). Similarly, a mathematics parser 204 is provided that evaluates expressions according to a set of characteristics, such as distinctive formats 702 in which mathematical expressions 108 are often provided (e.g., inline equations and vertically aligned expressions comprising a fraction) and a set of symbols 704 that are more likely to appear in text expressions 106 than mathematical expressions 108 (e.g., arithmetic operators and equality symbols).

The parsers may be applied to the expressions within various regions 302 in the following manner. As a first example 710, a first region 302 may comprise a set of expressions 106 that embody a paragraph format 702, and that utilize several instances of a symbol 704 that is representative of text expressions 106. The text parser 202 may therefore provide a high classification confidence 206 that the expression comprises a text expression 106, while the mathematics parser 204 provides a low classification confidence 206 that the expression comprises a mathematical expression 108. Accordingly, the expression may be identified as a text expression 106. Similarly, as a second example 712, a second region 302 may comprise a set of expressions 106 that embody an inline format 702 and a fraction 122, and that utilize several instances of symbol 704 that are representative of mathematical expressions 108. The text parser 202 may therefore provide a low classification confidence 206 that the expression comprises a text expression 106, while the mathematics parser 204 provides a high classification confidence 206 that the expression comprises a mathematical expression 108. Accordingly, the expression may be identified as a mathematical expression 108.

As a fifth variation of this second aspect, the parsing may use the proximity of expressions to assist the identification of other expressions. As a first such example, the parsing may comprise first identifying a selected region 302 as one of a mathematics region 306 and a text region 304 (e.g., identifying a set of symbols that exhibit a high classification confidence 206 of comprising a mathematical expression 108, such as an equation or a mathematical structure such as a fraction), and then expanding the selected region 302 to include additional symbols that are near the selected region 302 and that are similar to symbols within the selected region 302. For example, the symbol sequence "sine" may be considered ambiguous if evaluated in isolation, but its proximity to a region 302 identified as a mathematics region 306 with a high classification confidence 206 may increase the classification confidence 206 that the symbol sequence is a mathematical expression 108 that is part of the mathematics region 306. Conversely, the proximity of this symbol sequence to a text region 304 may increase the classification confidence 206 that the symbol sequence is a text expression 106 that is part of the text region 304. The parsing may therefore be performed by expanding previously identified regions 302 to include other nearby symbols. Such parsing may endeavor to identify groups of similar content into various areas of the document 102, such as a rectangle comprising a set of similarly characterized symbols. As a second such example, the parsing may involve identifying a first region 302 as one of a mathematics region 306 and a text region 302, and identifying a second region 302 within the first region 302 as a different region type than the first region 302, such as a region 302 of a particular type is embedded within a region 302 of a different type. For example, a narrative description of the work of Einstein (which is identified as a text expression 106 within a text region 304) may include a reference to the theory of general relativity as expressed by the equation "$e=mc^2$," which may be identified as a mathematical expression 108 within a mathematics region 306. Alternatively or additionally, the parsing may involve classifying a region only where the region 304 is above a region threshold size. For example, it may be undesirable to classify a short expression such as "a+b" as a mathematical expression 108 if it is embedded in a text expression 106 of substantial length, where the classification confidence 206 of characterizing the expression as a text expression 106 is not substantially lower than the classification confidence 206 of characterizing the expression as a mathematical expression 108.

Figure 8:
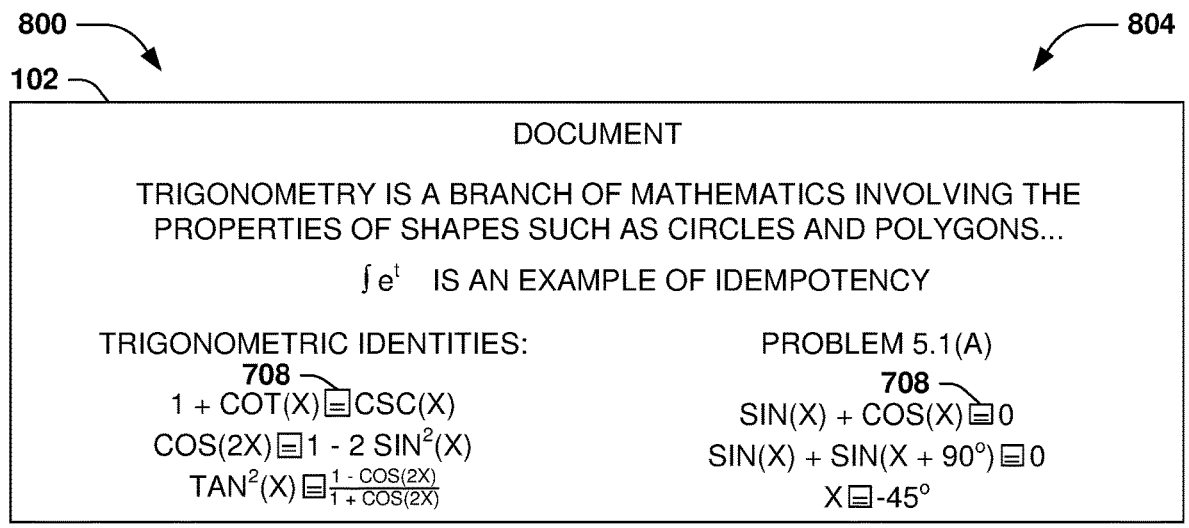
FIG. 8 is an illustration of example scenarios featuring examples of parsing the content of a document in accordance with the techniques presented herein.
Figure 8:
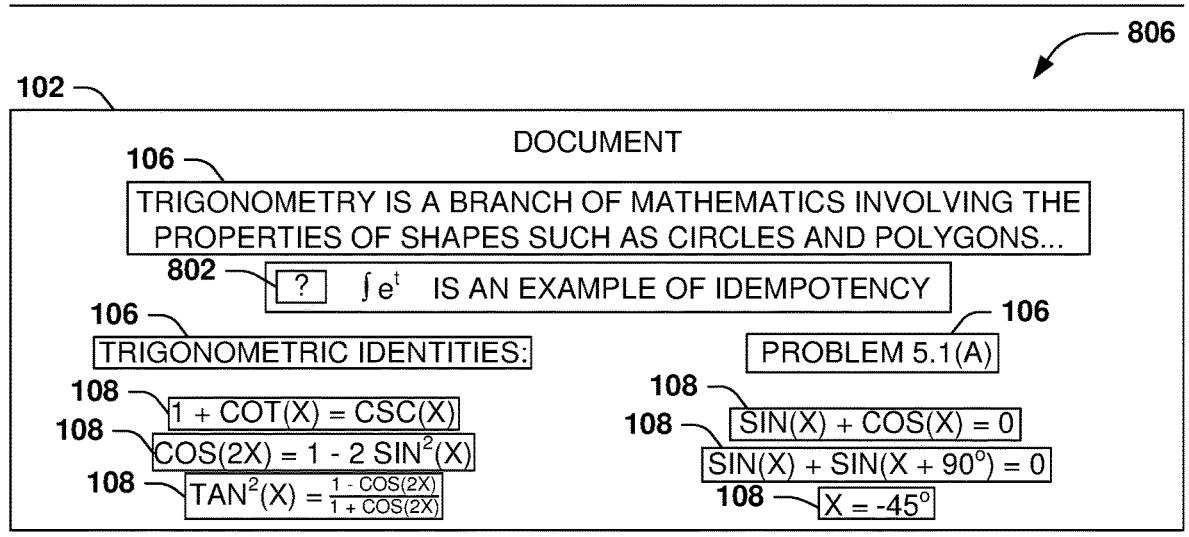
Figure 8:
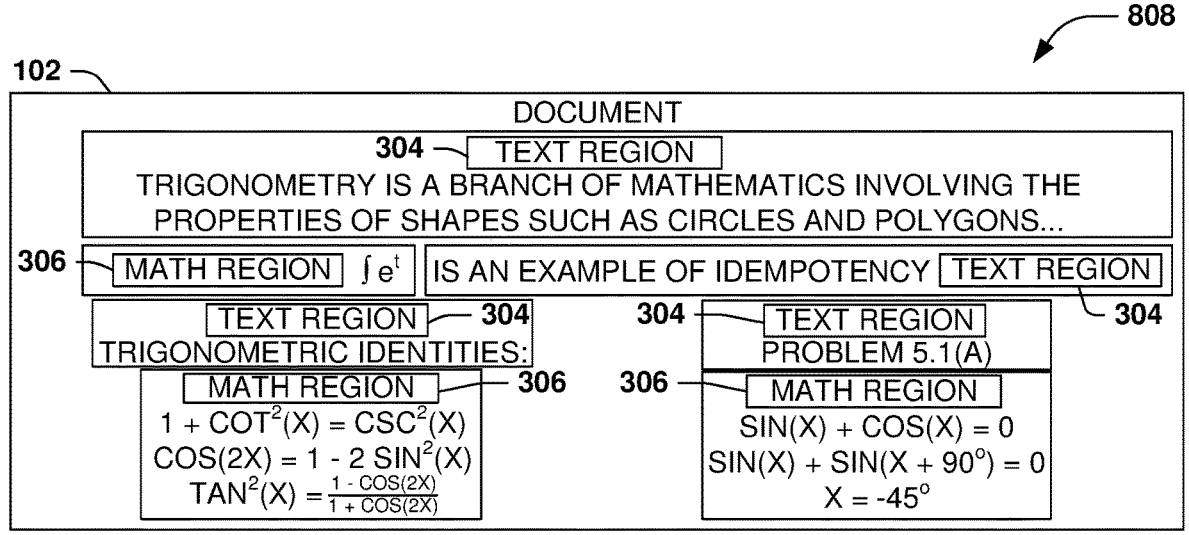

FIG. 8 is an illustration of an example scenario 800 involving the classification of regions 302 as one of a text region 304 and a mathematics region 306. In this example scenario 800, at a first time 804, the document 102 may be evaluated to identify symbols 708 that are representative of mathematical expressions 108, such as the equality symbol.

At a second time 806, the symbols that are horizontally inline with and proximate to the identified equality symbol 708 may be grouped together with the inline symbol, which may be collectively identified as a mathematical expression 108. Other symbols 106 that are characteristic of text expressions 106 may be similarly grouped together and identified as text expressions 106. Additionally, an ambiguous collection of proximate symbols 802 may be identified as ambiguous, i.e., including symbols 708 that are characteristic of both text expressions 106 and mathematical expressions 108. The symbols 708 of this collection may therefore be evaluated with a higher degree of granularity, leading to a determination of a first subset of symbols 708 as a mathematical expression 108 and a second subset of symbols 708 as a text expression 106.

At a third time 808, rectangular regions may be defined that enclose a set of similarly identified expressions, and may be classified according to the expressions. Text regions 304 may be identified as collections of text expressions 106, and mathematics regions 306 may be identified as collections of mathematical expressions 108. The ambiguous collection of proximate symbols 802 may be partitioned into two regions 302, with a first region 302 comprising a mathematics region 306 and a second region 302 comprising a text region 304. In this manner, the content 104 of the document 102 may be parsed in a stepwise manner to classify all of the symbols and expressions within the document 102. Many such techniques may be utilized to perform the parsing of the content 104 of the document 102 and the classification of regions 302 in accordance with the techniques presented herein.

E3. Parsing Process

A third aspect that may vary among embodiments of the techniques presented herein involves the organization of the computational process in order to apply the parsing techniques described herein to the content 104 of a document 102. That is, while a particular set of parsing techniques may be selected for an embodiment, the manner in which such parsing techniques are implemented as a document evaluation system 408 may significantly affect the results of the evaluation of the document 102.

As a first variation of this third aspect, the parsing may be applied to the document 102 in various ways, particularly while the user is creating the content 104. For example, in some variations, the content 104 (and, optionally, the sequence of input characters and/or strokes) may be parsed and/or recognized during the creation of the content 104, e.g., as part of a continuous, realtime process. In other variations, the evaluation of the document 102 may be partitioned into a content capturing phase (during which the content 104 and, optionally, the sequence of content creation are merely received and stored) and a content parsing and recognizing phase (during which the content 104 and, optionally, the sequence of content creation are classified into regions 302 of various types, and then recognized using the corresponding recognizer). The content parsing and recognizing phase may occur on a periodic basis (e.g., initiating parsing and recognition once per minute to evaluate batches of newly provided content 104); on an idle basis (e.g., waiting for an idle moment when processing capacity is plentiful, such as 500 milliseconds of idle time, and then invoking the content parsing and recognition over the content 104 of the document 102); and/or on an on-demand basis (e.g., awaiting a request from the user 102 to parse and/or recognize the content 104 of a document 102, and/or until an indexing process is invoked over the data set of a user that includes the document 102). In still other variations, the evaluation of the document 102 may be distributed; e.g., the parsing of regions 302 into one of a text region 304 and a mathematics region 306 may be performed in an approximately continuous manner, while the recognition of the content 104 of the document 102, as a potentially more computationally intensive process, may occur on a deferred basis. As one example, the document parser 410 may evaluate the content 104 of a document 102 in response to a selection by a user of a selected portion of the document 104, and a request by the user to recognize the selected portion of the document 104.

As a second variation of this third aspect, the document 102 may be parsed by a mathematics parser 204 to identify the mathematical expressions 108 (e.g., regions 302 of the document 102 that exhibit a high classification confidence 206 of comprising mathematical expressions 108), and the remainder of the document may be classified as a text region 304. Alternatively, the document 102 may parsed by a text parser 202 to identify text expressions 106 (e.g., regions 302 of the document 102 that exhibit a high classification confidence 206 of comprising text expressions 106), and the remainder of the document may be classified as a mathematics region 306. As another example, the document 102 may be parsed by a text parser 202 and a mathematics parser 204 to classify regions 302 respectively as a text regions 304 and mathematics regions 306. In some embodiments, the text parser 202 and the mathematics parser 204 may be applied concurrently to the document 102, where the document parser 410 concurrently receives, from the text parser 202 and the mathematics parser 204, claims to respective regions 302 to be classified as one of a text region 304 and a mathematics region 306. In other embodiments, the parsers may be applied sequentially; e.g., a first parser may be applied to the document 104 first (e.g., a parser that is more likely to match the content 104), and the other parser may be applied to a remainder of the content 104 that the first parser did not affirmatively classify. As another example, the classification may be binary (e.g., classifying each region 302 as one of a text region 304 and a mathematics region 306 based upon the classification confidences 206, even if the classification confidence 206 of the resulting classification is low), or may be limited by a classification confidence threshold. That is, the respective parsers may claim various regions 302 as providing content 104 that matches the content type of the parser. Ambiguous regions may be left as unclassified (temporarily or pending reevaluation after additional content 104 is provided), or may be resolved by evaluation with a different parsing technique (e.g., grouping it with a nearby region 302), or by asking a user to classify the content 104 as either a text region 304 or a mathematics region 306.

As a third variation of this third aspect, the parsing may iterate over the content 104 of the document 102 in various ways. As a first such example, the parsing may group the content 104 into regions 302 based upon spatial clustering, and the respective regions 302 may be characterized accordingly. As a second such example, the parsing may involve enumerating the symbols of the document 102, and then performing the classification of the regions 302 until the symbols have been classified into either a text region 304 or a mathematics region 306. For example, the parsing may involve first choosing a collection of symbols of the document 102, and then mapping the collection of symbols to recognized formatting, such as a mathematical expression format of a mathematical expression 108 (e.g., identifying a particular collection of symbols as matching the format of a fraction) or a sentence and paragraph structure of a text expression 106.

As a fourth variation of this third aspect, a variety of techniques may be utilized to perform the parsing and recognition processes. As a first such example, a developer may design the text parser 202, the mathematics parser 204, the text recognizer 114, and/or the mathematics recognizer 118 according to a set of heuristics, such as the set of symbols and formatting that characteristically represent text expressions 106 and mathematical expressions 108. Alternatively or additionally, adaptive techniques, such as an artificial neural network or a genetic algorithm, may be utilized to perform the parsing, classification, and/or recognition. For example, a device may comprise a trainer that provides training documents to an adaptive document evaluator, comprising at least one of the document parser and the document recognizer, and to train the adaptive document evaluator according to the training documents. The parsing of expressions, classification of regions 302, and/or recognition of content 104 may then be evaluated by the adaptive document evaluator (optionally according to a classification confidence threshold generated by the adaptive technique). Such training may be performed, e.g., over a set of training documents that are provided as general examples of text expressions 106 and mathematical expressions 108, and/or over the documents 102 of a specific individual, such as a user of the device, to adapt the parsing, classification, and/or recognition techniques to the personal manner in which the individual creates and/or edits content 104. Many such techniques may be utilized to apply the parsing, classification, and recognition techniques to documents 102 in accordance with the techniques presented herein.

E4. Parsing and Recognition Uses

A fourth aspect that may vary among embodiments of the techniques presented herein involves the uses of the results of the parsing and/or recognition tasks.

As a first variation of this fourth aspect, a device may indicate the results of the parsing, classification, and/or recognition to a user in a variety of ways. As a first such example, the device may visually represent the content 104 of text regions 304 differently than the content 104 of mathematics regions 306, such as color-coding the regions 302 differently based at least in part on the content type, and/or applying a different visual style to the regions 302, such as presenting borders in different visual styles that indicate the text regions 304 and the mathematics regions 306. As a second such example, the device may indicate a completion and/or progress of the parsing, classification, and/or recognition tasks to the user in an explicit manner, such as a progress bar, status indicator, and/or text status area that describes the invocation, progress, completion, and/or results of the various processing tasks involved in the evaluation of the document 102. The user may also be permitted to alter the document evaluation processes; e.g., the borders of the respective regions 302 may include resizing controls that the user may manipulate to adjust the sizes, shapes, and/or locations of the regions 302, including the expressions included therein. The user may also be permitted to correct and/or re-designate regions 302, such as changing the classification of a region 302 from a text region 304 to a mathematics region 306 (e.g., because the classification is incorrect, or because the user intends to edit the content of a region 302 with an initially correct classification to provide content 104 of a different type that is inconsistent with the initial classification). The user interface may also permit the user to create new regions 302, to remove existing regions 302, to merge or divide regions 302, and/or to alter the set of recognized region types (e.g., the user may define a new classification of region for a particular type of content, such as a code region that stores programming instructions, such that the parsers and/or recognizers may automatically identify the content 104 of the region 302 that stores code expressions, classify the region 302 as a code region, and apply a user interface that is appropriate for the code region).

As a second variation of this fourth aspect, the parsing and recognition of the content 104 of the document 102 may affect the presentation and adaptation of the user interface of a document editing environment of the document 102. For example, while a user is creating and/or editing content 104 in a region 302 of the document 102 that has been classified as a mathematics region 306, a device may present a mathematics user interface for a mathematical tool, such as an equation editor; and while a user is creating and/or editing content 104 in a region 302 of the document 102 that has been classified as a text region 304, the device may present a text user interface for a text tool, such as editing controls that enable the user to choose bolding, underlining, font styles and colors, and spell-checking and grammar-checking capabilities. As another example, the device may format and/or reformat the content 104 of the document 102 based at least in part on the parsing, classification, and/or recognition; e.g., the user interface may interpret user input within a text region 304 as text and may apply a flow layout that wraps the text expressions 106 in a paragraph form, and may interpret user input within a mathematics region 306 as mathematical expressions 108 and may apply an inline expression layout that positions equations in a vertical sequence.

As a third variation of this fourth aspect, the document 102 may be stored in various ways as a result of the parsing, classification, and/or recognition. As a first such example, the document 102 may be stored as an aggregation, collage, or sequence of the text expressions 106 and the mathematical expressions 108, which may preserve the order in which the user created the expressions and any semantic intent provided in the order (e.g., a narrative comprising mathematical expressions 108 with text expressions 106 appended as explanation). As a second such example, the document 102 may be stored as separate collections of text expressions 106 and mathematical expressions 108. Separate storage may be advantageous, e.g., to enable separate search processes to be applied to the text expressions 106 and the mathematical expressions 108 in case the user provides a search string to be applied to a particular type of content 104 (e.g., a request to search for all mathematical expressions 108 featuring the character sequence "sine").

As a fourth variation of this fourth aspect, a variety of supplemental tools may be provided based on the various types of content 104. For example, when a user 416 selects a text region 304, the device may present a user interface comprising a set of text expression tools, such as formatting tools; spell- and grammar-checking tools; and translation and narration tools. When a user 416 selects a mathematics region 306, the device may automatically replace the user interface presenting the text expression tools with a user interface comprising a set of mathematical expression tools, such as a mathematical expression editor; mathematical expression solvers that solve the recognized mathematical expressions 108 in the mathematics region 306; and visualization tools that visualize the results of the mathematical expressions 108.

Figure 9:
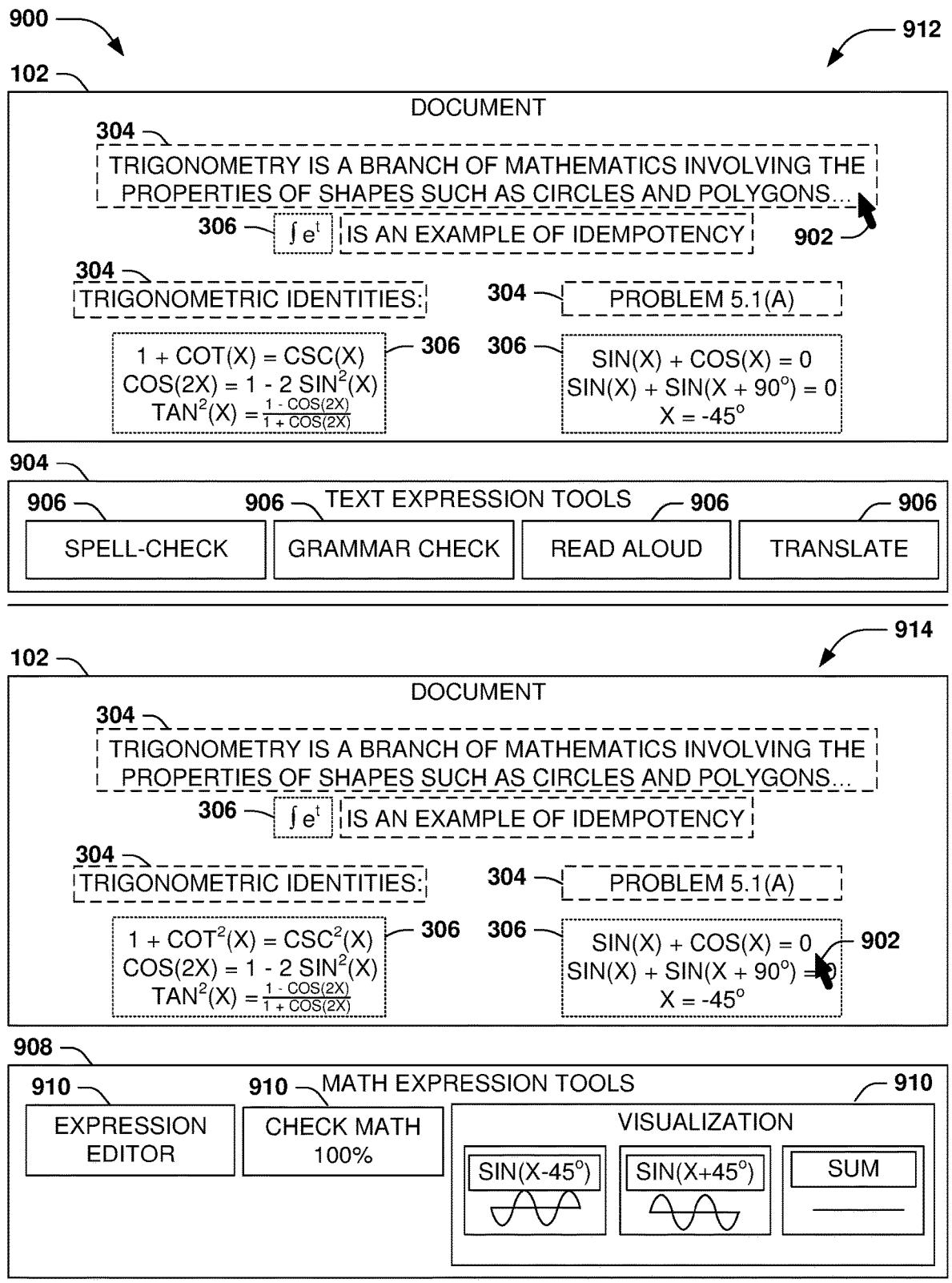
FIG. 9 is an illustration of example scenarios featuring examples of an adaptive user interface that responds to the selection of various regions that have been classified in accordance with the techniques presented herein.

FIG. 9 is an illustration of an example scenario 900 featuring user interfaces that may be presented to a user 416 during the creation, editing, and/or review of a document 102. In this example scenario 900, the various regions 302 of the document are presented with visual borders that distinguish the text regions 304 and the mathematics regions 306. Additionally, at a first time 912, the user 416 may position a cursor 902 within a region 302 that has been classified by the parsers as a text region 304, and the device may present a text expression user interface 904 comprising a collection of text expression tools 906 that assist the user 416 in working with text expressions 106, such as a spell-check tool 906; a grammar check tool 906; a narration tool 906 that reads the text expression 106 to the user 416; and a translation tool 906 that translates the text expression 106 into a different language. At a second time 914, when the user 416 has positioned the cursor 902 in a region 302 that has been classified by the parsers as a mathematics region 906, the device may automatically replace the text expression user interface 904 with a mathematical expression user interface 908 comprising an expression editor tool 910 that assists the user 416 in entering mathematical expressions 108 (e.g., inserting mathematical expression formatting structures such as exponents and fractions); a mathematical expression checking tool 910 that verifies the accuracy of the mathematical expressions 108 entered by the user 416 (e.g., an automated homework grading tool); and a mathematical expression visualization tool 910 that automatically generates and presents a visualization of the mathematical expressions 108 within the mathematics region 306. When the user 416 later selects a text region 304, the device may replace the mathematical expression user interface 908 with the text expression user interface 904. In this manner, the user interface of the device may automatically adapt to facilitate the creation, editing, and review of the various expressions presented in the document 102 in response to the results of the parsers applied to classify the content 104 of the regions 302 as one of a text region 304 and a mathematics region 306. Many such techniques may be devised that utilize the results of the parsing in accordance with the techniques presented herein.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device that evaluates a document, the device comprising:
   a processor; and
   a memory storing instructions that, when executed by the processor, cause the device to:
      apply a mathematical expression parser to the document to determine, for respective characteristics of a region of the document, a math classification confidence of a content portion as comprising at least one mathematical expression, wherein determining the math classification confidence of the content portion as comprising at least one mathematical expression further comprises:
         identifying a selected region as one of a mathematics region and a text region; and
         expanding the selected region to include additional symbols that are near the selected region and that are similar to symbols within the selected region;
      apply a text parser to the document to determine, for respective characteristics of the region of the document, a text classification confidence of the content portion as comprising at least one text expression;
      based at least in part on a comparison between the math classification confidence and the text classification confidence of the respective characteristics of the content portion, classify respective regions of the document as one of the mathematics region and the text region;
      apply a text recognizer to the regions classified as text regions to generate at least one recognized text expression;
      apply a mathematics recognizer to the regions classified as mathematics regions to generate at least one recognized mathematical expression;
      compile a composite document comprising the at least one recognized text expression and the at least one recognized mathematical expression; and
      present the composite document to a user via a display of the device.

2. The device of claim 1, wherein determining the math classification confidence of the content portion as comprising at least one mathematic expression further comprises: identifying, as a mathematical expression, an inline symbol sequence joined by an equality connector.

3. The device of claim 1, wherein determining the math classification confidence of the content portion as comprising at least one mathematic expression further comprises:
   identifying, as a mathematical expression, an inline symbol sequence primarily comprising mathematical symbols; and
   identifying, as a text expression, sequences of symbols arranged as words and separated by spaces.

4. The device of claim 1, wherein determining the math classification confidence of the content portion as comprising at least one mathematic expression further comprises:
   identifying, as a mathematical expression, a sequence of symbols in a mathematical structure; and
   identifying, as a text expression, a sequence of symbols in a paragraph structure.

5. The device of claim 1, wherein determining the math classification confidence of the content portion as comprising at least one mathematic expression further comprises:
   tracking a handwriting process of a user;
   identifying, as a text expression, a set of handwritten symbols in a substantially linear sequence; and
   identifying, as a mathematical expression, a set of handwritten symbols in a substantially non-linear sequence.

6. The device of claim 1, wherein determining the math classification confidence of the content portion as comprising at least one mathematic expression further comprises: identifying, as a mathematical expression, a mathematical drawing.

7. The device of claim 1, wherein determining the math classification confidence of the content portion as comprising at least one mathematic expression further comprises:
   choosing a collection of symbols of the document; and
   mapping the collection of symbols to a mathematical expression format.

8. The device of claim 1, wherein determining the math classification confidence of the content portion as comprising at least one mathematic expression further comprises: defining a region as a rectangle comprising a set of symbols.

9. The device of claim 1, wherein determining the math classification confidence of the content portion as comprising at least one mathematic expression further comprises:
   identifying a first region as one of the mathematics region and the text region; and
   identifying a second region within the first region as a different region type than the first region.

10. The device of claim 1, wherein determining the math classification confidence of the content portion as comprising at least one mathematic expression further comprises: classifying a region as one of the mathematics region and the text region only where the region is above a region size threshold.

11. The device of claim 1, wherein classifying the respective regions of the document further comprises:
    identifying an overall classification confidence of a region as one of the mathematics region and the text region; and classifying the region only where the overall classification confidence is above a classification confidence threshold.

12. A system of evaluating a document, the system comprising:
a document parser that:
applies a mathematical expression parser to the document to determine, for respective characteristics of a region of the document, a math classification confidence of a content portion as comprising at least one mathematical expression, wherein determining the math classification confidence of the content portion as comprising at least one mathematic expression further comprises:
identifying a selected region as one of a mathematics region and a text region; and
expanding the selected region to include additional symbols that are near the selected region and that are similar to symbols within the selected region;
applies a text parser to the document to determine, for respective characteristics of the region of the document, a text classification confidence of the content portion as comprising at least one text expression, and
based at least in part on a comparison between the math classification confidence and the text classification confidence of the respective characteristics of the content portion, classifies respective regions of the document as one of the mathematics region and the text region;
a document recognizer that:
applies a text recognizer to the regions classified as text regions to generate at least one recognized text expression, and
applies a mathematics recognizer to the regions classified as mathematics regions to generate at least one recognized mathematical expression;
a document compiler that compiles a composite document comprising the at least one recognized text expression and the at least one recognized mathematical expression; and
a display configured to present the composite document to a user.

13. The system of claim 12, further comprising:
a trainer that:
provides training documents to an adaptive document evaluator, comprising at least one of the document parser and the document recognizer, to train the adaptive document evaluator according to the training documents; and
evaluates the adaptive document evaluator according to a classification confidence threshold.

14. The system of claim 12, wherein the document parser determines the math classification confidence of the content portion as comprising at least one mathematic expression by:
applying a text parser and a mathematics parser to the document; and
receiving, from a selected parser comprising one of the text parser and the mathematics parser, at least one region claimed by the selected parser as a region to be classified as a content region that includes content matching the selected parser.

15. The system of claim 14, wherein the document parser:
concurrently applies the text parser and the mathematics parser to the document; and
concurrently receive, from the text parser and the mathematics parser, claims to respective regions to be classified as one of the text region and the mathematics region.

16. The system of claim 12, wherein the document parser determines the math classification confidence of the content portion as comprising at least one mathematic expression in response to:
a selection, by a user, of a selected portion of the document; and
a request, by the user, to recognize the selected portion of the document.

17. A method of evaluating a document, the method involving a device having a processor and comprising:
executing, by the processor, instructions that cause the device to:
apply a mathematical expression parser to the document to determine, for respective characteristics of a region of the document, a math classification confidence of a content portion as comprising at least one mathematical expression, wherein determining the math classification confidence of the content portion as comprising at least one mathematic expression further comprises:
identifying a selected region as one of a mathematics region and a text region; and
expanding the selected region to include additional symbols that are near the selected region and that are similar to symbols within the selected region;
apply a text parser to the document to determine, for respective characteristics of the region of the document, a text classification confidence of the content portion as comprising at least one text expression;
based at least in part on a comparison between the math classification confidence and the text classification confidence of the respective characteristics of the content portion, classify respective regions of the document as one of the mathematics region and the text region;
apply a text recognizer to the regions classified as text regions to generate at least one recognized text expression;
apply a mathematics recognizer to the regions classified as mathematics regions to generate at least one recognized mathematical expression;
compile a composite document comprising the at least one recognized text expression and the at least one recognized mathematical expression; and
present the composite document to a user view a display of the device.

18. The method of claim 17, wherein executing the instructions further causes the device to:
for respective mathematics regions, present a mathematics user interface for a mathematical tool; and
for respective text regions, present a text user interface for a text tool.

19. The method of claim 18, wherein the mathematical tool further comprises:
a mathematical expression solver that solves the at least one recognized mathematical expression in the at least one mathematics region of the document.

* * * * *